(12) United States Patent
Park et al.

(10) Patent No.: US 11,952,701 B2
(45) Date of Patent: Apr. 9, 2024

(54) DOOR OPEN MONITORING FOR INTELLIGENT DEVICE

(71) Applicant: LG ELECTRONICS INC., Seoul (KR)

(72) Inventors: Hyunsung Park, Seoul (KR); Sangyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 794 days.

(21) Appl. No.: 17/090,806

(22) Filed: Nov. 5, 2020

(65) Prior Publication Data

US 2021/0131011 A1    May 6, 2021

(30) Foreign Application Priority Data

Nov. 6, 2019   (KR) .......................... 10-2019-0140896

(51) Int. Cl.
| | | |
|---|---|---|
| *G06T 7/70* | (2017.01) | |
| *D06F 34/20* | (2020.01) | |
| *G06V 10/82* | (2022.01) | |
| *G06V 20/64* | (2022.01) | |

(52) U.S. Cl.
CPC ............... *D06F 34/20* (2020.02); *G06T 7/70* (2017.01); *G06V 10/82* (2022.01); *G06V 20/647* (2022.01); *G06T 2207/20081* (2013.01); *G06T 2207/20084* (2013.01)

(58) Field of Classification Search
CPC .. D06F 34/20; D06F 2103/00; D06F 2103/40; D06F 2105/58; D06F 33/30; D06F 39/14; D06F 37/42; G06T 7/70; G06T 2207/20081; G06T 2207/20084; G06T 7/00; G06T 2207/10016; G06T 2207/10021; G06T 2207/30232; G06V 10/82; G06V 20/647; G06N 3/08; H04N 7/18

See application file for complete search history.

(56) References Cited

U.S. PATENT DOCUMENTS

| | | | | |
|---|---|---|---|---|
| 9,064,394 | B1* | 6/2015 | Trundle | G08B 13/19684 |
| 11,334,712 | B1* | 5/2022 | Nadig | G10L 15/22 |
| 2014/0313328 | A1* | 10/2014 | Park | F25D 29/00 |
| | | | | 348/143 |
| 2020/0149204 | A1* | 5/2020 | Xu | D06F 34/08 |
| 2021/0025097 | A1* | 1/2021 | Lee | G06V 20/52 |
| 2021/0117717 | A1* | 4/2021 | Ha | G06N 20/00 |
| 2021/0142110 | A1* | 5/2021 | Tian | G06V 20/68 |
| 2021/0192329 | A1* | 6/2021 | Shin | F25D 29/00 |
| 2021/0288833 | A1* | 9/2021 | Yamamoto | G08B 7/00 |

* cited by examiner

*Primary Examiner* — Bobbak Safaipour
(74) *Attorney, Agent, or Firm* — LEE, HONG, DEGERMAN, KANG & WAIMEY

(57) ABSTRACT

Door open monitoring for an intelligent device is disclosed. In a method for monitoring a door of an intelligent device according to an exemplary embodiment of the present disclosure, it is decided whether to send a message relating to the ventilation of the inside of a drum by analyzing an image generated through a camera placed in the door. A door monitoring system of the present disclosure may be associated with an artificial intelligent module, an unmanned aerial vehicle (UAV), a robot, an augmented reality (AR) device, a virtual reality (VR) device, a 5G service-related device, etc.

19 Claims, 19 Drawing Sheets

DOOR OPEN MONITORING FOR INTELLIGENT DEVICE

CROSS-REFERENCE TO RELATED APPLICATION(S)

Pursuant to 35 U.S.C. § 119(a), this application claims the benefit of earlier filing date and right of priority to Korean Patent Application No. 10-2019-0140896, filed on Nov. 6, 2019, the contents of which are hereby incorporated by reference herein in its entirety.

BACKGROUND OF THE DISCLOSURE

Field of the Disclosure

The present disclosure relates to door open monitoring for an intelligent device.

Related Art

Artificial intelligence technology includes machine learning (deep learning) and element technology that utilizes machine learning.

Machine learning is an algorithm technology in which a machine classifies/learns the features of input data by itself. The element technology is intended to simulate human brain functions, such as perception, judgment, and the like, using machine-learning algorithms, such as deep learning, and includes techniques such as linguistic understanding, visual understanding, inference/prediction, knowledge representation, motion control, and the like.

For a variety of intelligent devices including washing machines, clothes stylers, dryers, ovens, and refrigerators, it is important that the opening and/or closing of the doors be monitored. In an example, when a washing machine finishes a washing course, the door needs to be opened at a certain angle or more so that the inside of the drum is ventilated. Unless the door is opened wide enough, the inside window of the door or the inside of the drum may be contaminated due to steam.

SUMMARY OF THE DISCLOSURE

The present disclosure aims at solving the aforementioned needs and/or problems.

The present disclosure also aims at implementing door open monitoring for an intelligent device which, if a user does not leave the door of a washing machine open wide enough, sends a message to the user to maintain the sanitation of the inside of the washing machine.

The present disclosure also aims at implementing door open monitoring for an intelligent device by which it is possible to decide whether the door is properly opened or not, by using a learning model that is trained on a plurality of images obtained for different angles of the door.

According to one aspect of the present disclosure, there is provided a method for monitoring a door of an intelligent device, the method comprising: generating an image through a camera placed in the door; producing an output for identifying the status of the door, by applying the generated image to a trained learning model; and deciding to send a message informing that the angle between the door and a cabinet cover is less than a specific angle, based on the output.

Furthermore, the camera may be placed between an outer cover of the door and inside glass.

Furthermore, the generating of an image may comprise: identifying that the door is opened when a set washing course is finished; generating the image after a set amount of time after identifying that the door is opened.

Furthermore, the learning model may be a classification model.

Furthermore, the classification model may be an artificial neural network-based learning model that is trained on a plurality of images generated for different angles between the door and the cabinet cover.

Furthermore, the plurality of images may comprise a first image group generated for angles between a first angle and a second angle and a second image group generated for angles between a third angle and a fourth angle, wherein the first image group is labeled with first class information by which the message is sent, and the second image group is labeled with second class information by which the message is not sent.

Furthermore, the first and second angles may be angles at which the door is opened but ventilation is not possible.

Furthermore, the third and fourth angles may be angles at which the door is opened and ventilation is possible.

Furthermore, the second and third angles may be the same.

Furthermore, the learning model may be an artificial neural network-based learning model that comprises an input layer, an output layer, and at least one hidden layer, wherein the artificial neural network is a convolutional neural network.

Furthermore, the method may further comprise: identifying that the door is at a halt, based on the image; and starting AI processing in relation to the status of the door upon identifying that the door is at a halt.

Furthermore, the intelligent device is any one among a washing machine, a dryer, and a clothes styler.

According to another aspect of the present disclosure, there is provided an intelligent device comprising: a memory; a camera placed in a door, for generating an image; and a processor that produces an output for identifying the status of the door, by applying the generated image to a trained learning model, and decides to send a message informing that the angle between the door and a cabinet cover is less than a specific angle, based on the output.

The advantageous effects of door open monitoring for an intelligent device according to an exemplary embodiment of the present disclosure are as follows:

One advantage of the present disclosure is that, if a user does not leave the door of a washing machine open wide enough, a message can be sent to the user to maintain the sanitation of the inside of the washing machine.

Another advantage of the present disclosure is that it is possible to decide whether the door is properly opened or not, by using a learning model that is trained on a plurality of images obtained for different angles of the door.

Effects which can be acquired by the disclosure are not limited to the above described effects, and other effects that have not been mentioned may be clearly understood by those skilled in the art from the following description.

BRIEF DESCRIPTION OF THE DRAWINGS

To aid understanding of the present disclosure, the accompanying drawings, which are included as a portion of the detailed description, provide embodiments of the present disclosure, and describe the technical features of the present disclosure along with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
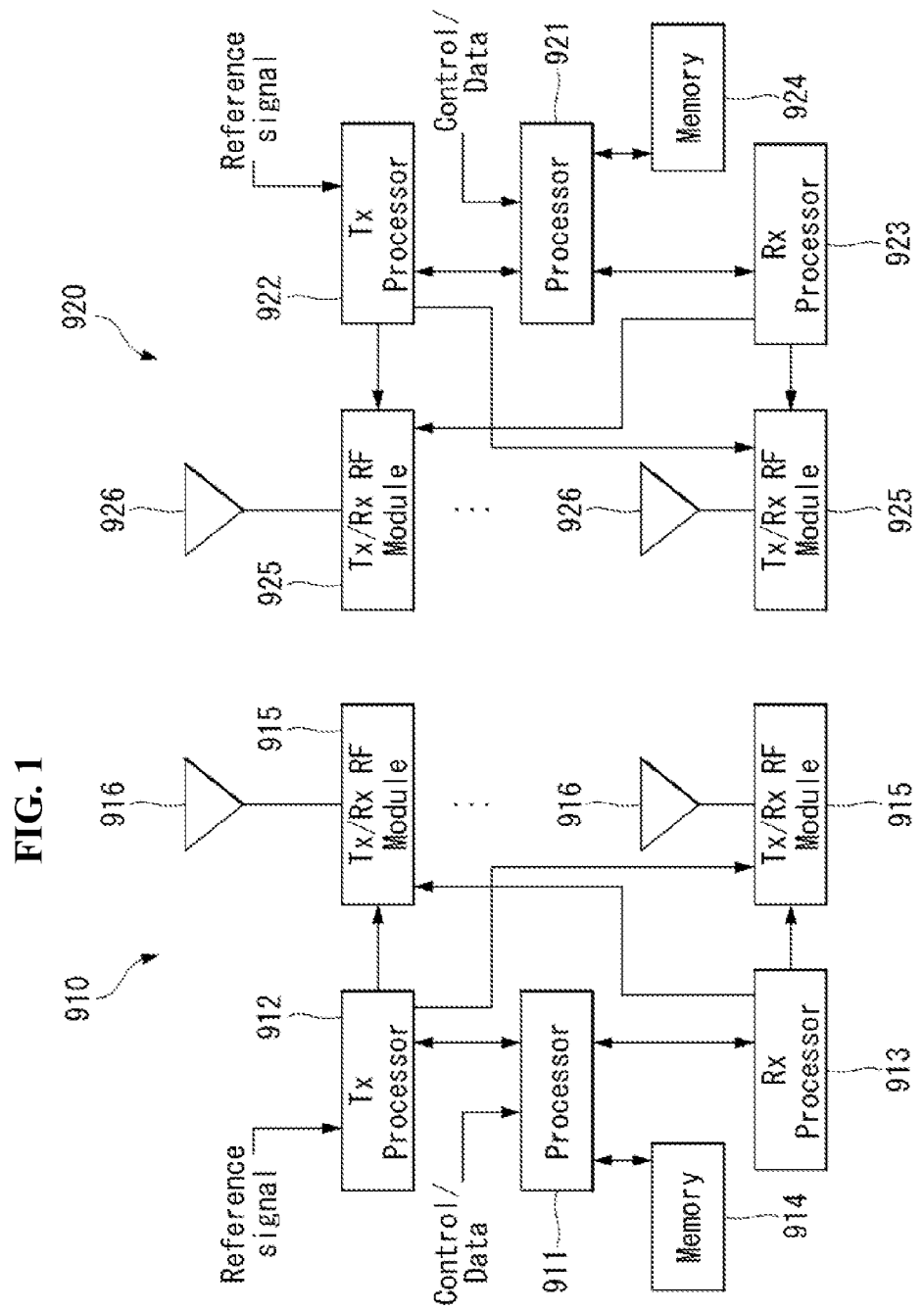
FIG. 1 illustrates a block diagram of a wireless communication system to which methods proposed in the present disclosure can be applied.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer). UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
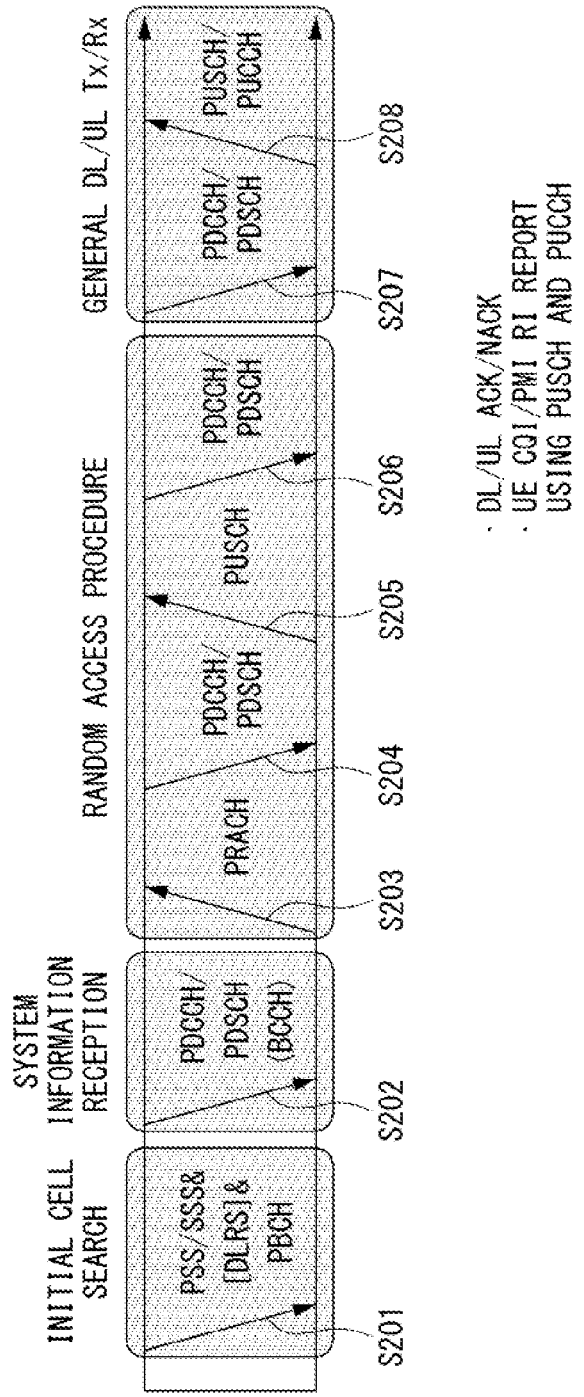
FIG. 2 illustrates an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam management (BM) procedure of 5G communication system

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfigIE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationlnfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCl by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
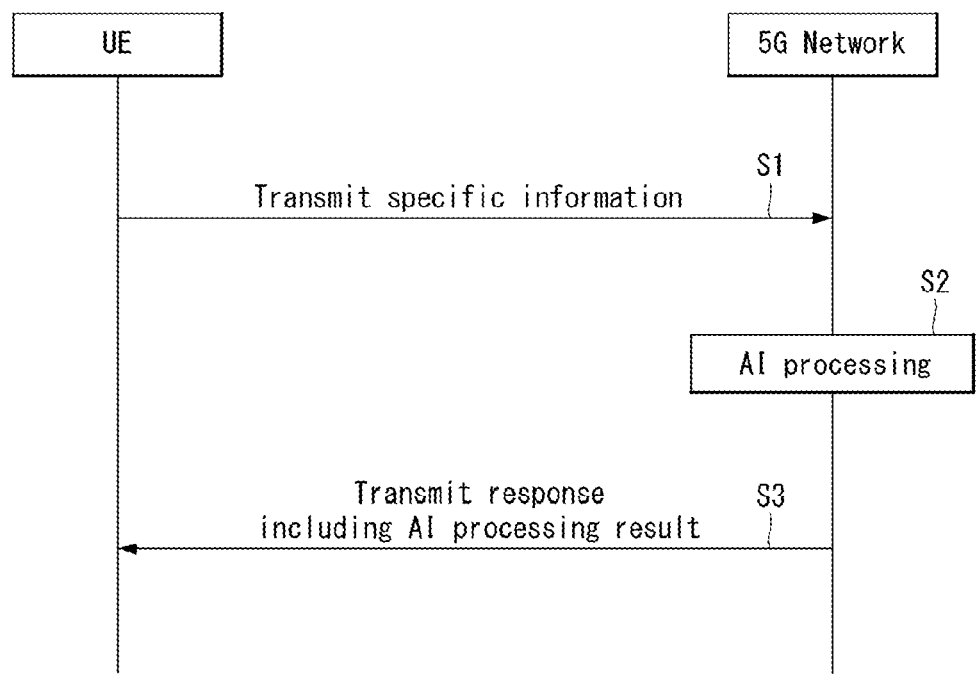
FIG. 3 illustrates an example of a basic operation of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information.

Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
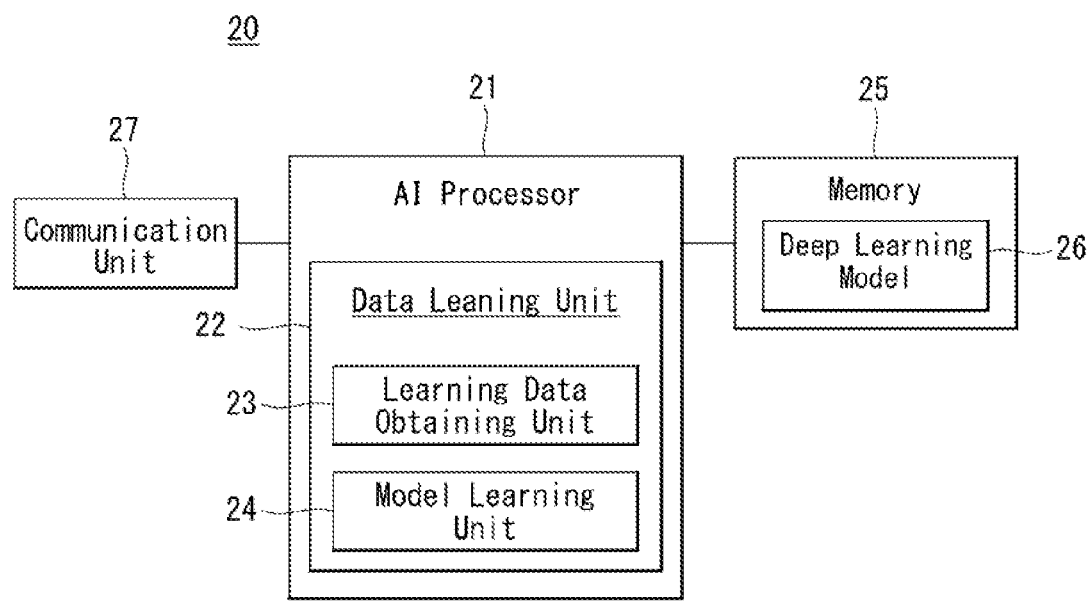
FIG. 4 is a block diagram of an AI device applied to various embodiments of present disclosure.

FIG. 4 is a block diagram of an AI device according to an embodiment of the present invention.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Figure 5:
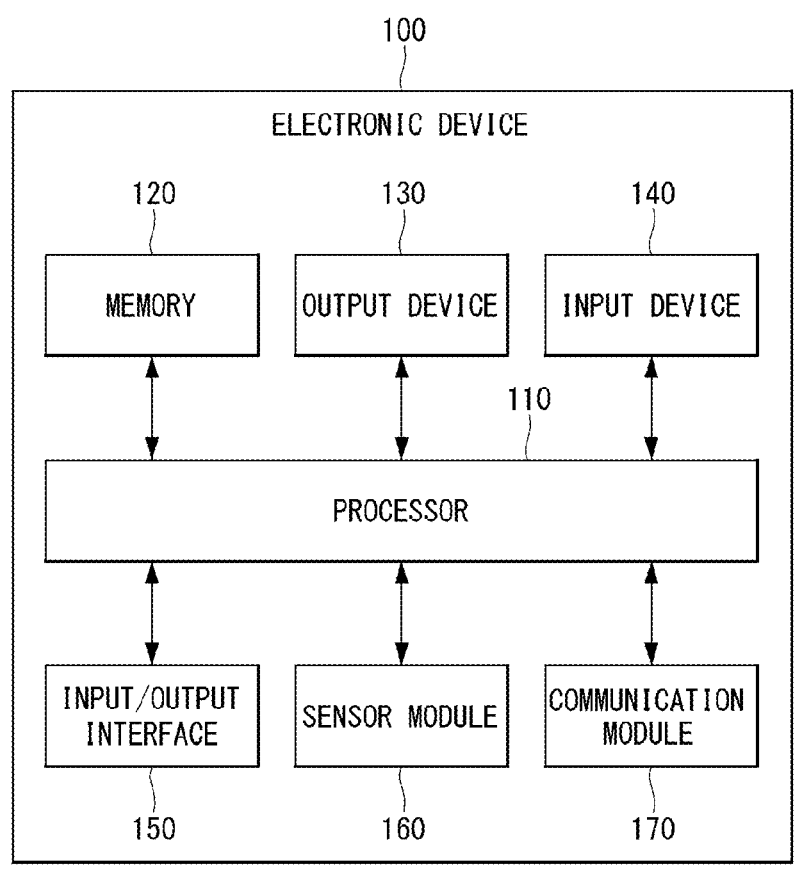
FIG. 5 is a view depicting a block diagram of an electronic device.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 5 is a view depicting a block diagram of an electronic device.

Referring to FIG. 5, the electronic device 100 may comprise at least one processor 110, a memory 120, an output device 130, an input device 140, an input/output interface 150, a sensor module 160, and a communication module 170.

The processor 110 may include one or more application processors AP, one or more communication processors CP, or at least one AI (artificial intelligence) processor. The application processor, communication processor, or AI processor may be included in different IC (integrated circuit) packages or in a single IC package.

The application processor may run an operating system or an application program to control a plurality of hardware or software elements connected to the application processor, and may process/compute various data including multimedia. In an example, the application processor may be implemented with a system on chip (SoC). The application processor may further include a graphic processing unit (GPU) (not shown).

The communication processor may perform a function of managing data links and converting communication protocols in communication between different electronic devices connected over a network to the electronic device 100. In an example, the communication processor may be implemented with an SoC. The communication processor may perform at least some of multimedia control functions.

Moreover, the communication processor may control data transmission and reception of the communication module 170. The communication processor may be implemented to be included as at least part of the application processor.

The application processor or the communication processor may load an instruction or data received from a non-volatile memory or at least one of other components connected to them on a volatile memory and process the loaded instruction or data. Also, the application processor or the communication processor may store data received from or generated by at least one of other components on a non-volatile memory.

The memory 120 may include an internal memory or an external memory. The internal memory may include at least one between a volatile memory (e.g., a dynamic random access memory (DRAM), a static RAM (SRAM), a synchronous dynamic RAM (SDRAM), and the like) and a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like). According to an exemplary embodiment, the internal memory may take the form of a solid-state drive (SSD). The external memory may further include a flash drive, for example, CompactFlash (CF), secure digital (SD), micro secure digital (Micro-SD), mini secure digital (Mini-SD), extreme digital (xD), memory stick, etc.

The output device 130 may include at least one between a display module and a speaker. The output device 130 may display various data including multimedia, text data, audio data, etc. or output them as sound.

The input device 140 may include a touch panel, a digital pen sensor, a key, or an ultrasonic input device. In an example, the input device 140 may be an input/output interface 150. The touch panel senses touch input via at least one among capacitive, resistive, infrared and ultrasonic methods. Additionally, the touch panel may further comprise a controller (not shown). In the case of the capacitive method, proximity sensing is possible, as well as direct touch. The touch panel may further include a tactile layer. In this case, the touch panel may provide tactile feedback to the user.

The digital pen sensor may be implemented in the same or similar way as receiving the user's touch input or by using a separate layer for recognition. A keypad or touch key may be used as the key. The ultrasonic input device is a device that allows a terminal to identify data by sensing micro sound waves through a pen that generates ultrasonic signals, which is capable of wireless sensing. The electronic device 100 may receive user input from an external device (for example, a network, computer, or server) connected to it by using the communication module 170.

The input device 140 may further include a camera module and a microphone. The camera module is a device for capturing images and video, and may include one or more image sensors, an image signal processor (ISP), or a flash LED. The microphone may receive audio signal and convert it into electrical signal.

The input/output interface 150 may receive an instruction or data as an input from the user via an input device or output device and deliver the received instruction or data to the processor 110, memory 120, communication module 170, and so on via a bus (not shown). In an example, the input/output interface 150 may provide the processor 110 with data on the user's touch input through the touch panel. In an example, the input/output interface 150 may provide the instruction or data received from the processor 110, memory 120, communication module 170, etc. via a bus as an output to the output device 130 through the output device 130. In an example, the input/output interface 150 may provide audio data processed through the processor 110 as an output to the user through a speaker.

The sensor module 160 may include at least one among a gesture sensor, a gyro sensor, a barometric pressure sensor, a magnetic sensor, an acceleration sensor, a grip sensor, a proximity sensor, an RGB (red, green, blue) sensor, a biosensor, a temperature/humidity sensor, an illumination sensor, and a UV (ultraviolet) sensor. The sensor module 160 may measure a physical quantity or detect the operating status of the electronic device 100, and may convert measured or detected information into electric signals. Additionally or alternatively, the sensor module 160 may include an E-nose sensor, an electromyography (EMG) sensor, an electroencephalogram (EEG) sensor (not shown), an electrocardiogram (ECG) sensor, a photoplethysmography (PPG) sensor, a heart rate monitor (HRM) sensor, a perspiration sensor, or a fingerprint sensor. The sensor module 160 may further include a control circuit to control at least one sensor included therein.

The communication module 170 may include a wireless communication module or an RF module. The wireless communication module may include, for example, Wi-Fi, BT, GPS, or NFC. For example, the wireless communication module may provide a wireless communication function by using wireless frequencies. Additionally or alternatively, the wireless communication module may include a network interface or modem for connecting the electronic device 100 to a network (e.g., Internet, LAN, WAN, telecommunication network, cellular network, satellite network, POTS, or 5G network).

The RF module may be in charge of transmitting and receiving data, for example, RF signals or invoked electronic signals. In an example, the RF module may include a transceiver, a power amp module (PAM), a frequency filter, or a low noise amplifier (LNA). Also, the RF module may further include parts for transmitting and receiving electron waves in free space in wireless communication—for example, a conductor or conducting wire.

The electronic device 100 according to various exemplary embodiments of the present disclosure may include at least one among a TV, a refrigerator, an oven, a clothes styler, a robotic cleaner, a drone, an air conditioner, an air purifier, a PC, a speaker, a home CCTV, lighting, a washing machine, and a smart plug. The components of the electronic device 100 illustrated in FIG. 4 exemplify components commonly provided in electronic devices, so the electronic device 100 according to the exemplary embodiments of the present disclosure are not limited to the above-described components but may omit some of them or have additional components if required. The electronic device 100 may perform artificial intelligence-based control operation by receiving AI processing results from the AI device illustrated in FIG. 4, or may perform AI processing in on-device mode by including an AI module which is a single module into which the components of the AI device are integrated.

In various exemplary embodiments of the present disclosure, the electronic device may be a washing machine, and a method for monitoring the opening of the door of the washing machine, and a server and intelligent washing machine for monitoring the opening of the door will be described.

Figure 6:
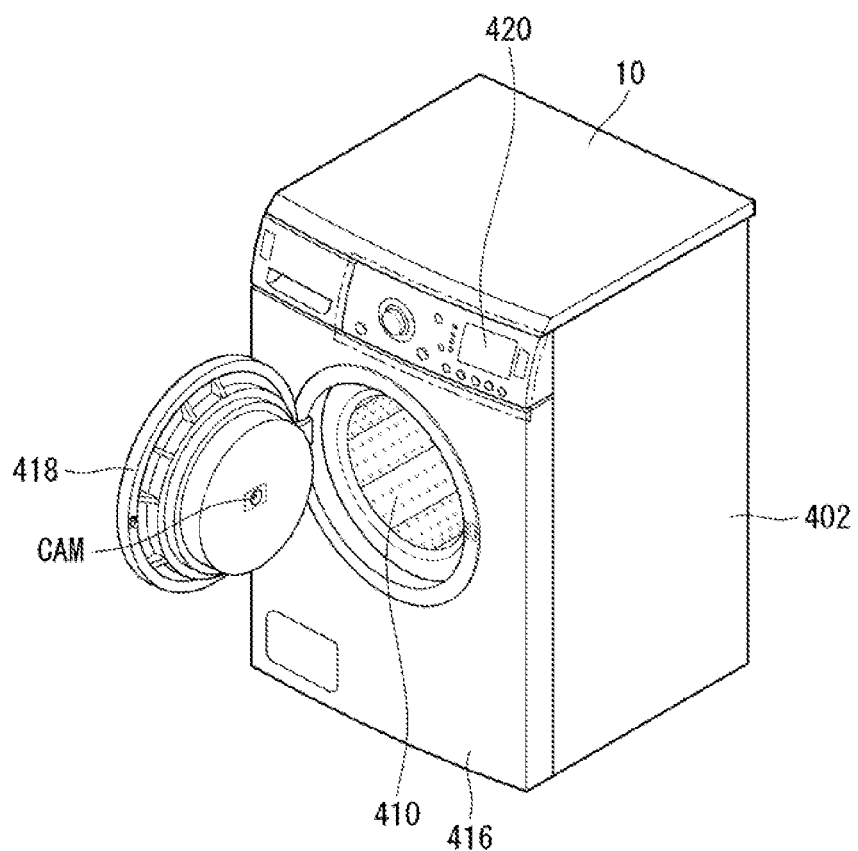
FIG. 6 is a view illustrating the exterior of an intelligent washing machine.

FIG. 6 is a view illustrating the exterior of an intelligent washing machine.

Referring to FIG. 6, an intelligent washing machine 10 on which a control method according to an exemplary embodiment of the present disclosure is implemented may comprise a cabinet 402 forming the exterior, a drum 410 placed on the inside of a tub (not shown), a motor (not shown) for rotating the drum, a cabinet cover 416 mounted to the front of the cabinet 402, a door 418 attached to the cabinet cover 416, and a control panel 420 for feeding operating instructions for the intelligent washing machine 10.

The cabinet cover 416 is mounted to the front of the cabinet 402 and has a laundry inlet formed at the center. The door 418 is rotatably installed on the cabinet cover 416 and opens and closes the laundry inlet. The control panel 420 has an input key that is placed on an upper part of the cabinet cover 426, for displaying the operating status of the washing machine and giving operating instructions for the intelligent washing machine.

Figure 7:
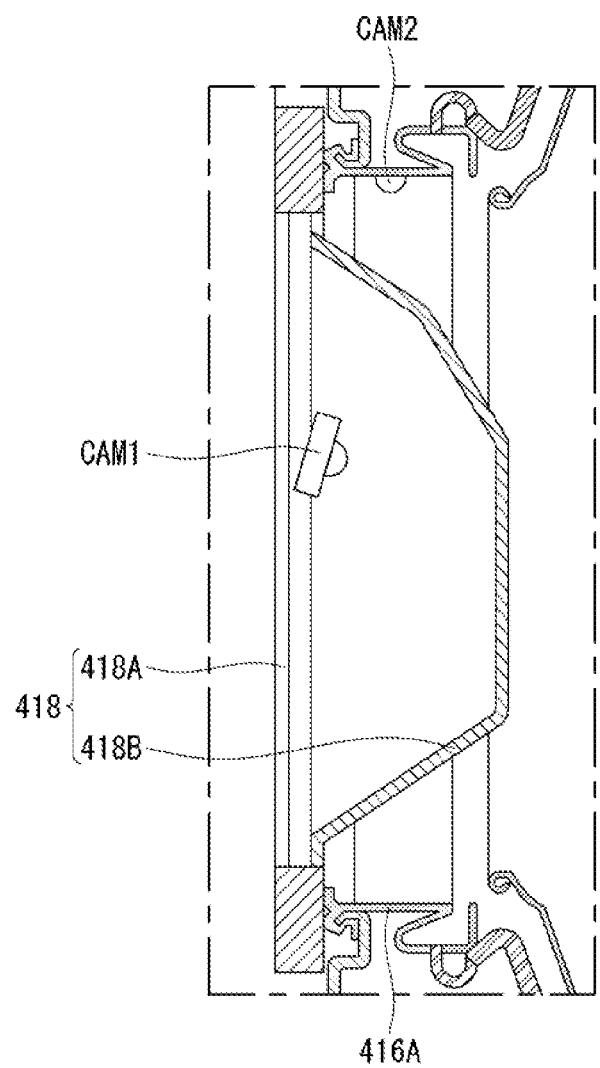
FIG. 7 is a view illustrating a camera in the intelligent washing machine adapted to an exemplary embodiment of the present disclosure.

FIG. 7 is a view illustrating a camera in the intelligent washing machine adapted to an exemplary embodiment of the present disclosure.

In an exemplary embodiment of the present disclosure, a camera CAM1 may be placed in the door 418 of the washing machine 10. The camera CAM1 may be placed between an outer cover 418A and inside glass 418B but is not limited to this. In an example where the camera CAM1 is placed in a space between the outer cover 418A and the inside glass 418B, it is possible to avoid any impacts or foreign substances coming from outside of the intelligent washing machine 10 and prevent contamination or contact with wash water or laundry in the drum 410.

Moreover, at least one camera CAM1 may be provided depending on the functionality and use of the intelligent washing machine 10. In an example, the camera CAM1 may be implemented as a stereo camera (or 3D camera) comprising a plurality of image sensors or as a 2D camera comprising one image sensor, but is not limited thereto. Such a camera CAM1 for capturing the inside of the drum 410 may be defined as a drum camera CAM1.

Figure 8:
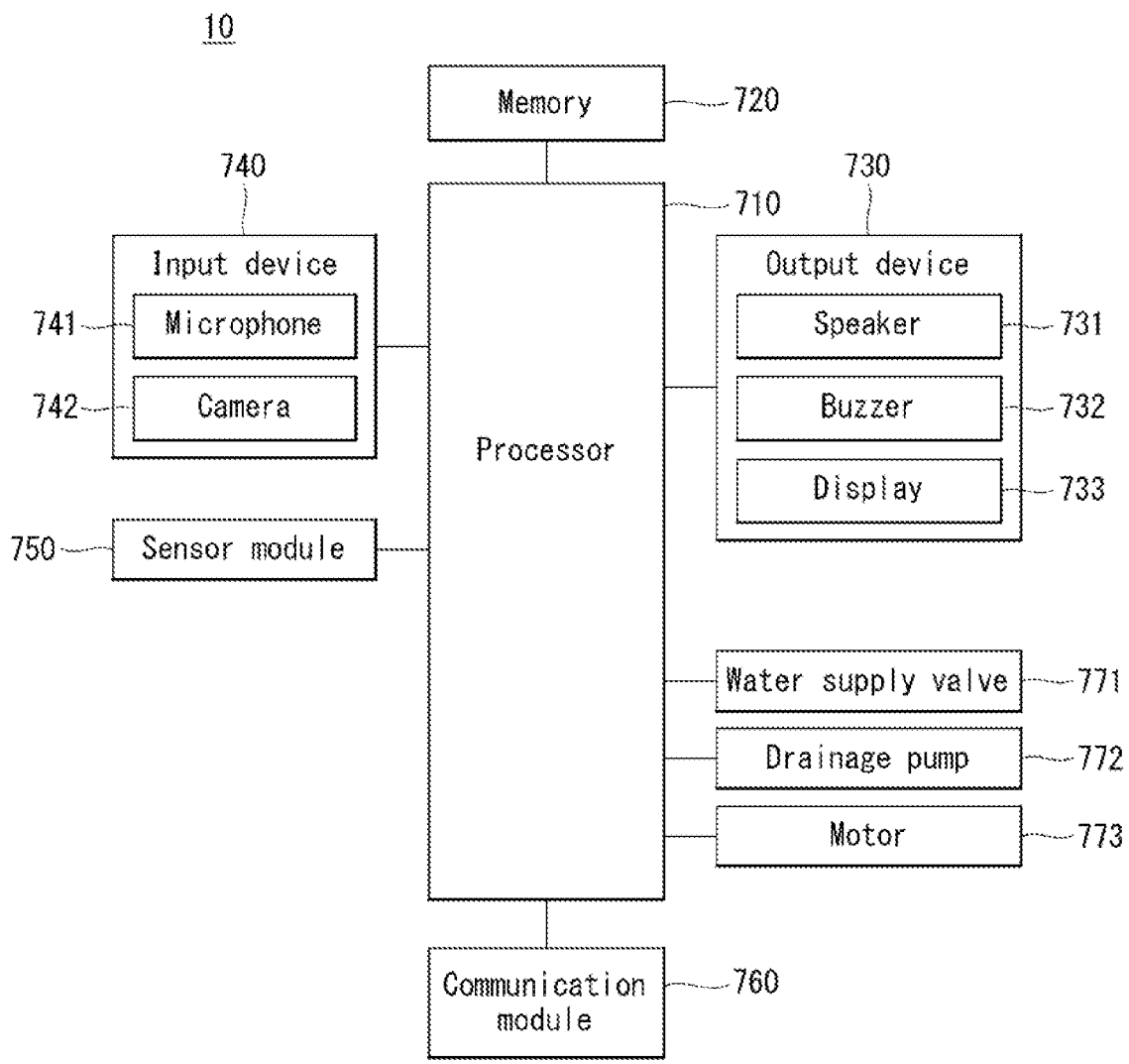
FIG. 8 is a block diagram depicting a configuration of an intelligent washing machine according to an exemplary embodiment of the present disclosure.

A plurality of cameras CAM1 may be placed on an inside wall of the outer cover 418A so as to face the inside glass 418B, and may obtain image data including an image of the inside glass 418B under control of the processor (710 of FIG. 8). The processor (710 of FIG. 8) may process and merge door images obtained by the plurality of cameras CAM1 or select one of the door images and apply it to one of at least one artificial neural network-based learning model.

According to an exemplary embodiment of the present disclosure, a gasket 416A for keeping wash water in the drum from spilling out may be formed around the perimeter of the laundry inlet. For example, the gasket 416A may keep wash water from spilling out between the drum 410 and the cabinet, between the drum 410 and the door, and so on. The gasket 416A may be made from rubber, but is not limited thereto.

According to an exemplary embodiment of the present disclosure, one of the plurality of cameras may be configured to capture the gasket 416A and obtain image data including an image of the gasket 416A. Since the inside glass 418B is positioned between the camera CAM2 and the gasket 416A while the door 418 is closed, the processor (710 of FIG. 8) may control in such a way as to obtain a gasket image while the door 418 is open. Such a camera CAM2 for capturing an image of the gasket 416A may be defined as a camera CAM2.

FIG. 8 is a block diagram depicting a configuration of an intelligent washing machine according to an exemplary embodiment of the present disclosure. The intelligent washing machine 10 of FIG. 8 will be described with a focus on the differences with the components described above with reference to FIG. 5, and any redundancies will be omitted.

Referring to FIG. 8, the intelligent washing machine 10 may comprise a processor 710, a memory 720, an output device 730, an input device 740, a sensor module 750, and a communication module 760. Meanwhile, the intelligent washing machine 10 may correspond to an example of the AI device described above with reference to FIG. 4.

The output device 730 may have an output means for presenting the user various information relating to the operation of the intelligent washing machine 10. In an example, the output device 730 may include a speaker or buzzer as an audio output means and a display as a graphic or text output means. In an example, the output device 73 may be placed on the control panel of FIG. 4, but is not limited to this.

The input device 740 may comprise at least one input means for feeding a predetermined signal or data to the intelligent washing machine 10 by user manipulation. In an example, the input device 740 may include a button, a dial, a touchpad, a microphone, etc. The input device 740 may be placed on the control panel, but is not limited to this.

According to an exemplary embodiment of the present disclosure, the input device 740 may include at least one camera CAM1 and CAM2, and the camera CAM1 and CAM2 may include the aforementioned door camera CAM1 and gasket camera CAM2.

The processor 720 may control the overall operation of the intelligent washing machine 10. The processor 710 may perform control operations including a washing stroke, a rinsing stroke, a dewatering stroke, and a drying stroke. The processor 710 may perform control operations according to a preset algorithm or control the operations of a motor 773, a water supply valve 771, and drainage pump 772 according to each stroke.

In various exemplary embodiments of the present disclosure, the processor 710 may apply images generated through a camera placed in the door to a learning model and produce an output for identifying the status of the door 418 and decide to send a message informing that the angle between the door 418 and the cabinet cover 416 is less than a specific angle, based on the output. In this case, the processor that performs AI processing using a learning model may be an AI processor. Moreover, the AI processing may be performed in a server provided inside the intelligent washing machine or communicatively connected to the intelligent washing machine 10 or a network comprising at least one server.

Figure 9:
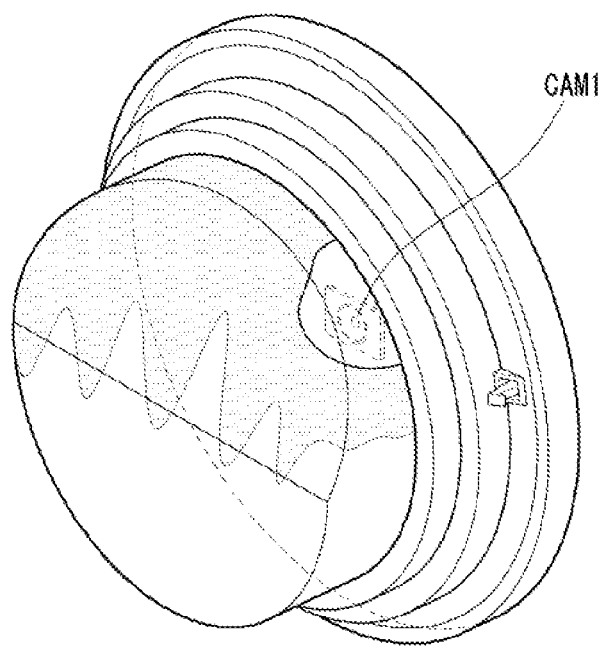
FIG. 9 is a view illustrating the relationship between the opening of the door and the sanitation of the drum.

FIG. 9 is a view illustrating the relationship between the opening of the door and the sanitation of the drum.

As described above with reference to FIG. 7, a camera CAM1 may be placed between the outer cover 418A of the door 418 and the inside glass 418B. The processor 710 may generate an image of the inside of the drum and/or a plurality of images of the rotation of the door 418 through the camera CAM1.

The plurality of images thus obtained may be used in the training and inference of a learning model used in an exemplary embodiment of the present disclosure.

When a washing course is finished, the inside of the drum may have a high humidity. To prevent problems associated with high humidity, the user may open the door 418 themselves, or the washing machine 10 may open the door on its own in response to a washing course finish signal. However, unless the door 418 is opened at a sufficiently wide angle, the inside of the drum cannot be ventilated well due to the inside glass provided in the door 418. If the inside of the drum is not ventilated well, moisture or drops of water may be produced on the inside glass 418B of the door 418 or the drum 410, resulting in worsening the status and sanitation of the washing machine 10.

Moreover, with the recent development of deep learning-based intelligent devices, the camera CAM1 placed in the door 418 of the washing machine 10 is frequently used to utilize vision recognition functionality. However, impurities produced on the inside glass 418B due to high humidity may increase the error rate of vision recognition.

In the present disclosure, a door monitoring method for solving the aforementioned problems occurring on the inside glass 418B or drum 410 after a washing course is finished will now be described.

Figure 10:
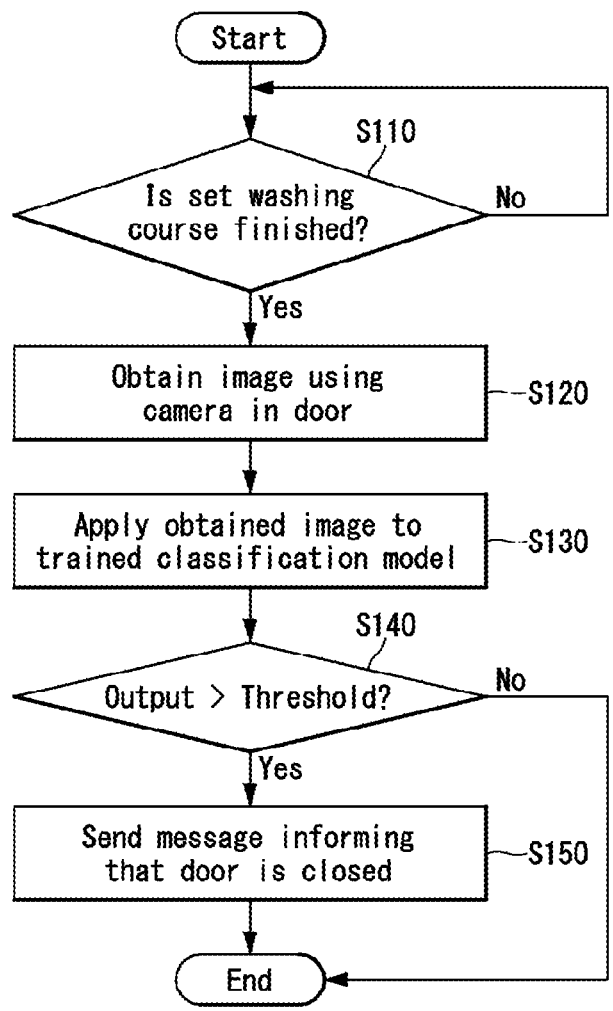
FIG. 10 is a flowchart of a door monitoring method according to an exemplary embodiment of the present disclosure.

FIG. 10 is a flowchart of a door monitoring method according to an exemplary embodiment of the present disclosure.

Referring to FIG. 10, when a set washing course is finished, the processor 710 may generate an image through a camera CAM1 placed in the door 418 (S110: YES, S120).

The camera CAM1 may be placed between the outer cover 418A of the door 418 and the inside glass 418B, as described with reference to FIG. 7. In various exemplary embodiments of the present disclosure, the processor 710 may control the generation of images through the camera CAM1 based on various events. In an example, the camera CAM1 may be controlled to generate an image when a set washing course is finished. In an example, the processor 710 may control the camera CAM1 to generate an image upon identifying that the door 418 is opened when a set washing course is finished. In an example, the processor 710 may control the camera CAM1 to generate an image after a certain amount of time after a set washing course is finished. In an example, the processor 710 may control the camera CAM1 to generate an image after a certain amount of time after identifying that the door 418 is opened when a set washing course is finished.

In various exemplary embodiments of the present disclosure, the processor 710 may identify that the door 418 is at a halt based on an obtained image. In an example, the processor 710 may obtain a plurality of images through the camera CAM1 and identify that the door 418 is at a halt by comparing a plurality of chronologically obtained images.

At this point, upon identifying that the door 418 is at a halt, the processor 710 may start AI processing to identify the status of the door 418. In an example, the status of the door 418 may refer to the angle between the door 418 and the cabinet cover 416.

The processor 710 may apply the generated image to a learning model (S130).

In an example, the learning model may be a classification model. The classification model may include a binary classification model and a multiclass classification model. The binary classification model may classify input data as one of two classes. The multiclass classification model may classify input data as one of three or more classes.

This classification model may be an artificial neural network-based learning model that comprises an input layer, an output layer, and at least one hidden layer. The artificial neural network may be a convolutional neural network (CNN).

The convolutional neural network may be interchangeably used with a convolution neural network. The convolutional neural network may be used to generate a model of image processing, but is not limited thereto and has been recently used in many fields including natural language processing (NLP). The neural network used in the learning model of the present disclosure is a convolutional neural network used to perform the modeling of image processing. The convolutional neural network may receive input data representing red, green, and blue components of an input image.

In this case, the input data may be processed by at least one convolutional layer. Specifically, the output of the at least one convolutional layer may be selectively processed by a fully connected layer. At least one neuron in the fully connected layer may be fully connected to every activated neuron of the previous layer. The processor 710 may produce an output for the convolutional neural network-based learning model by using the output of the fully connected layer. The activation of at least one neuron included in the fully connected layer may be computed with matrix multiplication in place of convolution. It is not always necessary to use fully connected layers in implementing every convolutional neural network.

Meanwhile, the processor 710 may produce an output for the above-described learning model of images. In an example, the processor 710 may apply a plurality of images captured at different angles of the door 418 to a convolutional neural network-based learning model, and produce an output based on feature information of the plurality of images captured at different angles of the door 418. Here, the output may be used as a value for identifying the status of the door 418.

If the output exceeds a preset threshold, the processor 710 may send to a communicatively connected terminal a message informing that the door 418 is closed (S140: YES, S150).

In an example, the message informing that the door 418 is closed is not limited to a message informing that the door 418 is fully closed, but may include a message informing that the angle between the door 418 and the cabinet cover 416 is less than a specific angle.

The processor 710 may decide whether to send a message informing that the angle between the door 418 and the cabinet cover 416 is less than a specific angle, based on the output, and may send the message to a communicatively connected terminal or not, depending on the result of decision-making.

Figure 11:
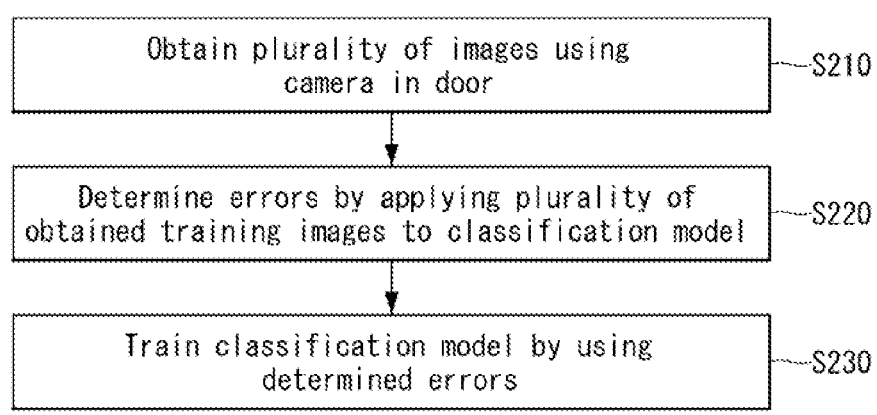
FIG. 11 is a flowchart of a training process for a learning model according to an exemplary embodiment of the present disclosure.

FIG. 11 is a flowchart of a training process for a learning model according to an exemplary embodiment of the present disclosure.

Referring to FIG. 11, the processor 710 may obtain a plurality of training images by using a camera CAM1 in the door 418 (S210).

As described above, the plurality of training images may include a plurality of images generated for different angles between the door 418 and the cabinet cover 416. The plurality of images used for training a classification model comprise a first image group generated for angles between a first angle and a second angle and a second image group generated for angles between a third angle and a fourth angle. In this case, the first image group may be labeled with first class information by which the message is sent, and the second image group may be labeled with second class information by which the message is not sent.

Training data applied to various exemplary embodiments of the present disclosure may include at least one training database, taking into consideration at least one among external lighting used for capturing at different angles of the door 418, the status of the drum 410, and changes in the outside environment of the washing machine.

In an exemplary embodiment of the present disclosure, the first and second angles may be angles at which the door 418 is opened but ventilation is not possible. In an example, the first angle may be 5 degrees, and the second angle may be 45 degrees (see FIG. 12). In this case, the third and fourth angles may be angles at which the door 418 is opened and ventilation is possible. In an example, the third angle may be 55 degrees, and the fourth angle may be the maximum angle at which the door 418 can rotate (see FIG. 13). The reason why the second angle and the third angle are not the same is because the door 418 of the washing machine 10 tends to move inward due to the inside glass 418B when the angle is between 45 and 60 degrees. That is, when the angle is between 45 and 60 degrees, the angle will eventually decrease to 45 degrees, in which case training is not done.

Meanwhile, the second angle and the third angle are not always different. In an example, there may be no movement caused by the inside glass 418B when the angle is between 45 and 60 degrees, depending on the position where the door 418 of the washing machine 10 or the washing machine 10 is placed. In this case, the second angle and the third angle may be the same. Hence, in another exemplary embodiment of the present disclosure, the second angle and the third angle may be the same. In an example, the second and third angles may be 50 degrees.

The processor 710 may determine errors by applying a plurality of obtained training images to a classification model (S220).

As described above, the classification model may have a plurality of training images applied to it by the processor 710 and produce a corresponding output. In this case, the processor 710 may determine errors by comparing the output for the plurality of training images with labels.

The processor 710 may train the classification model by using determined errors (S230).

In an example, the processor 710 may update various parameters including the weights and biases of an artificial neural network through back-propagation. As a result, the processor 710 may derive a result of decision-making based on the results of training on input data that is given after a training process, by using the classification model.

Figure 14:
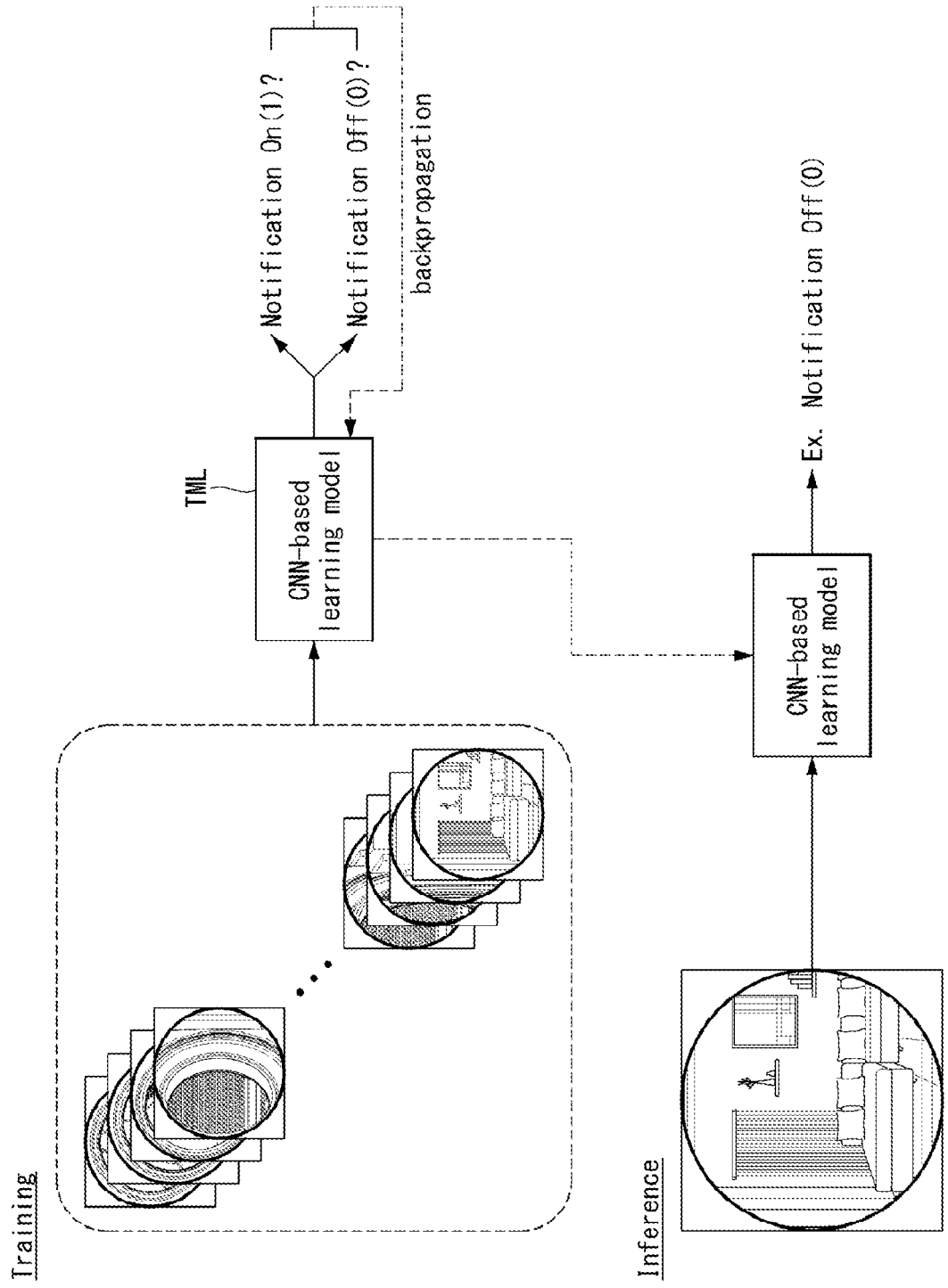
FIG. 14 is a view illustrating a training and inference process for a learning model according to an exemplary embodiment of the present disclosure.

FIG. 14 is a view illustrating a training and inference process for a learning model according to an exemplary embodiment of the present disclosure.

Figure 12:
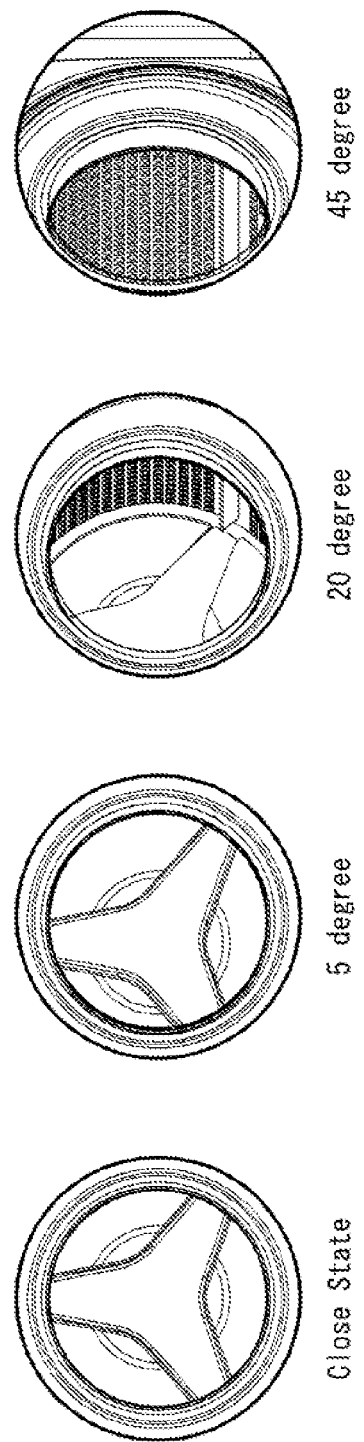
FIGS. 12 and 13 are views illustrating training data for a learning model according to an exemplary embodiment of the present disclosure.
Figure 13:
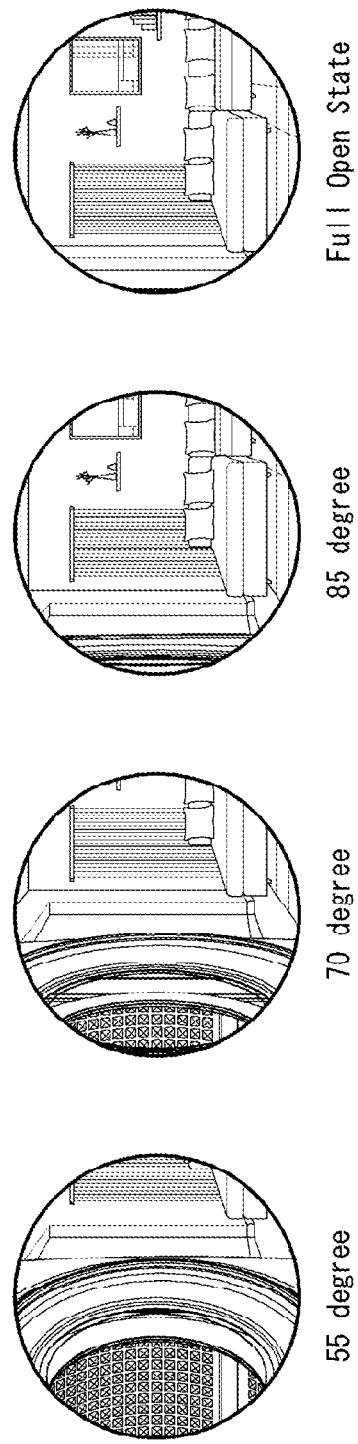

Referring to FIG. 14, training data may comprise a plurality of images illustrated in FIGS. 12 and 13. In an example, the plurality of images used as training data may include images obtained for different angles between the door 418 and the cabinet cove 416. In an example, the processor 710 may obtain a plurality of images for different angle units. Meanwhile, the angle units may include, but not limited to, 10 degrees, 5 degrees, 1 degree, and 0.5 degrees.

As described above with reference to FIG. 11, the processor 710 may repeat the process of applying a plurality of training images to a CNN-based learning model TML and training the learning model through back-propagation by comparing the output with labels. In this case, if errors are less than a preset threshold, the training process may be finished.

In this way, the trained learning model TML may be stored on a server or network end and used for AI processing, or may be stored on a recording medium such as an AI chip and provided in a device. An inference process using a trained CNN-based learning model TML according to the present disclosure will be described below.

The processor 710 may generate at least one image captured through a camera CAM1 in the door 418. The processor 710 may apply the image to a trained CNN-based learning model TML and derive a result of decision-making based on the output. In an example, if the output exceeds a preset classification threshold, the processor 710 may classify the input data as a class corresponding to the highest output. In an example, if an image showing that the angle between the door 418 and the cabinet is 40 degrees is applied to the CNN-based learning model TML, it may be decided that a message informing that the angle between the door 418 and the cabinet cover 416 is less than a specific angle is to be sent to at least one communicatively connected terminal, based on the output.

Figure 15:
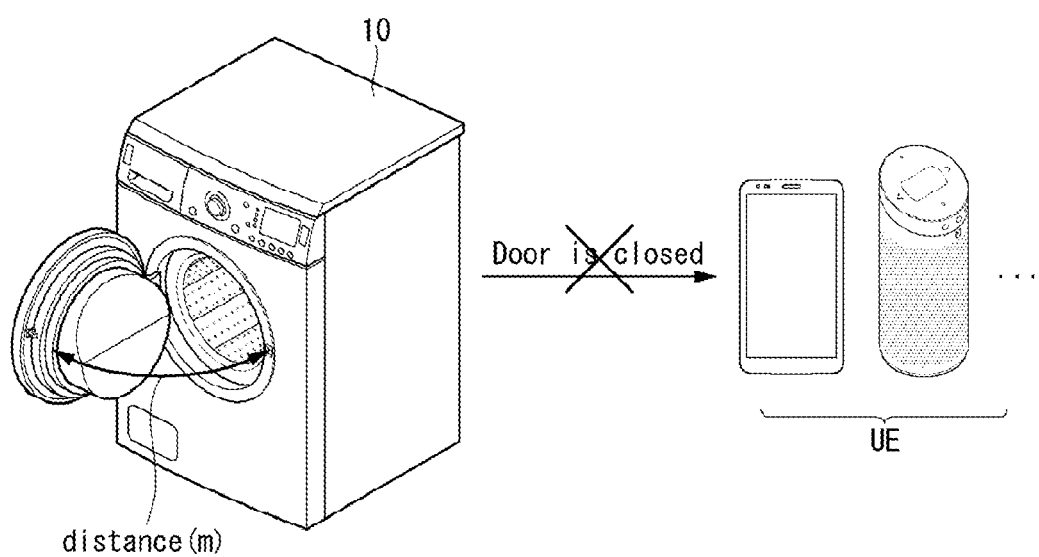
FIG. 15 is a view illustrating an example of not sending a message according to an exemplary embodiment of the present disclosure.

FIG. 15 is a view illustrating an example of not sending a message according to an exemplary embodiment of the present disclosure.

Referring to FIG. 15, the processor 710 may generate an image including the washing machine 10 and/or the outside environment of the washing machine 10, through a camera CAM1 placed in the door 418. The processor 710 may apply the generated image to a trained classification model and produce an output as the result of application.

In this case, the processor 710 may extract various feature vectors included in the image and compute an output by using the extracted feature vectors and the weights and biases of an artificial neural network.

In an example, the processor 710 may decide to not send a message, by analyzing the output for the instance in which the angle between the door 418 and the cabinet is equal to or greater than a specific angle. Hereupon, the processor 710 does not send the message to at least one external terminal UE communicatively connected through the communication module 760.

Figure 16:
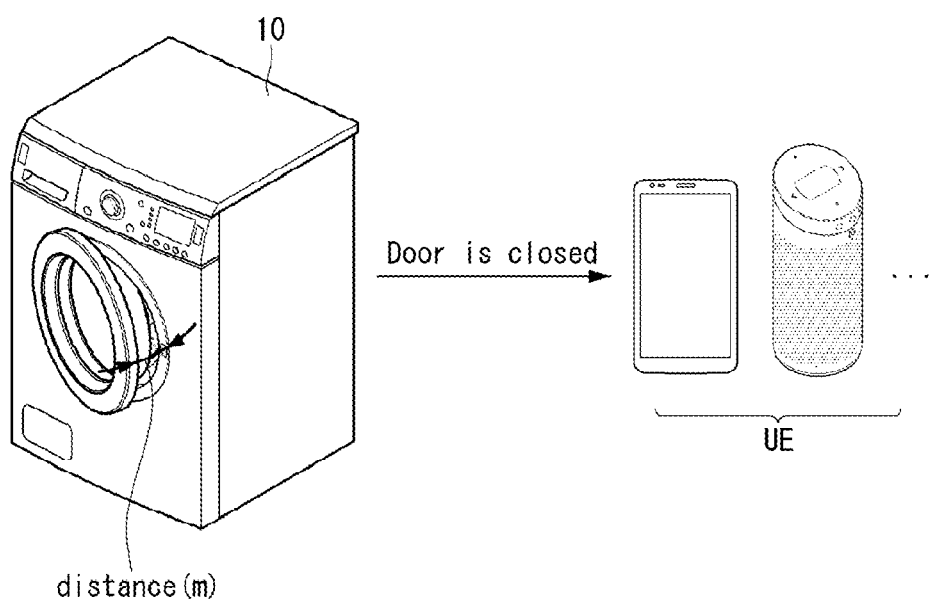
FIG. 16 is a view illustrating an example of sending a message according to an exemplary embodiment of the present disclosure.

FIG. 16 is a view illustrating an example of sending a message according to an exemplary embodiment of the present disclosure, and a description of redundancies between FIG. 15 and FIG. 16 will be omitted.

FIG. 16 illustrates an example in which the angle between the door 418 and the cabinet cover 416 is relatively small compared to FIG. 15. In this case, the processor 710 may decide to not send a message, by analyzing the output for the instance in which the angle between the door 418 and the cabinet is less than a specific angle. Hereupon, the processor 710 may send the message to at least one external terminal UE communicatively connected through the communication module 760.

Figure 17:
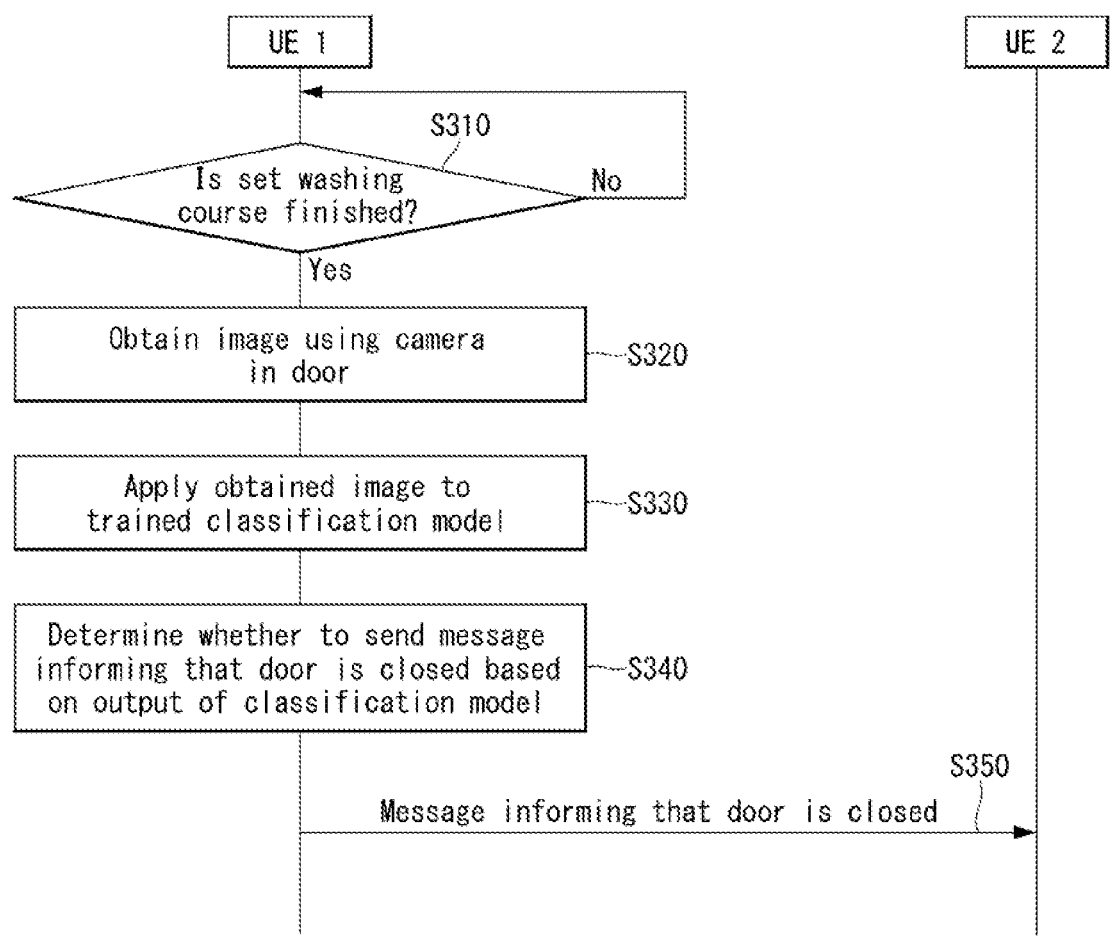
FIG. 17 is a sequence diagram of a door monitoring system according to an exemplary embodiment of the present disclosure.

FIG. 17 is a sequence diagram of a door monitoring system according to an exemplary embodiment of the present disclosure. UE1 may include at least one electronic device capable of clothing management. In an example, UE1 may include at least one among a washing machine, a dryer, and a clothes styler. UE2 may include an electronic device capable of presenting a message to a user through audio output or display. In an example, UE2 may include, but not limited to, a smartphone, a VR device, an XR device, or a speaker.

Figure 18:
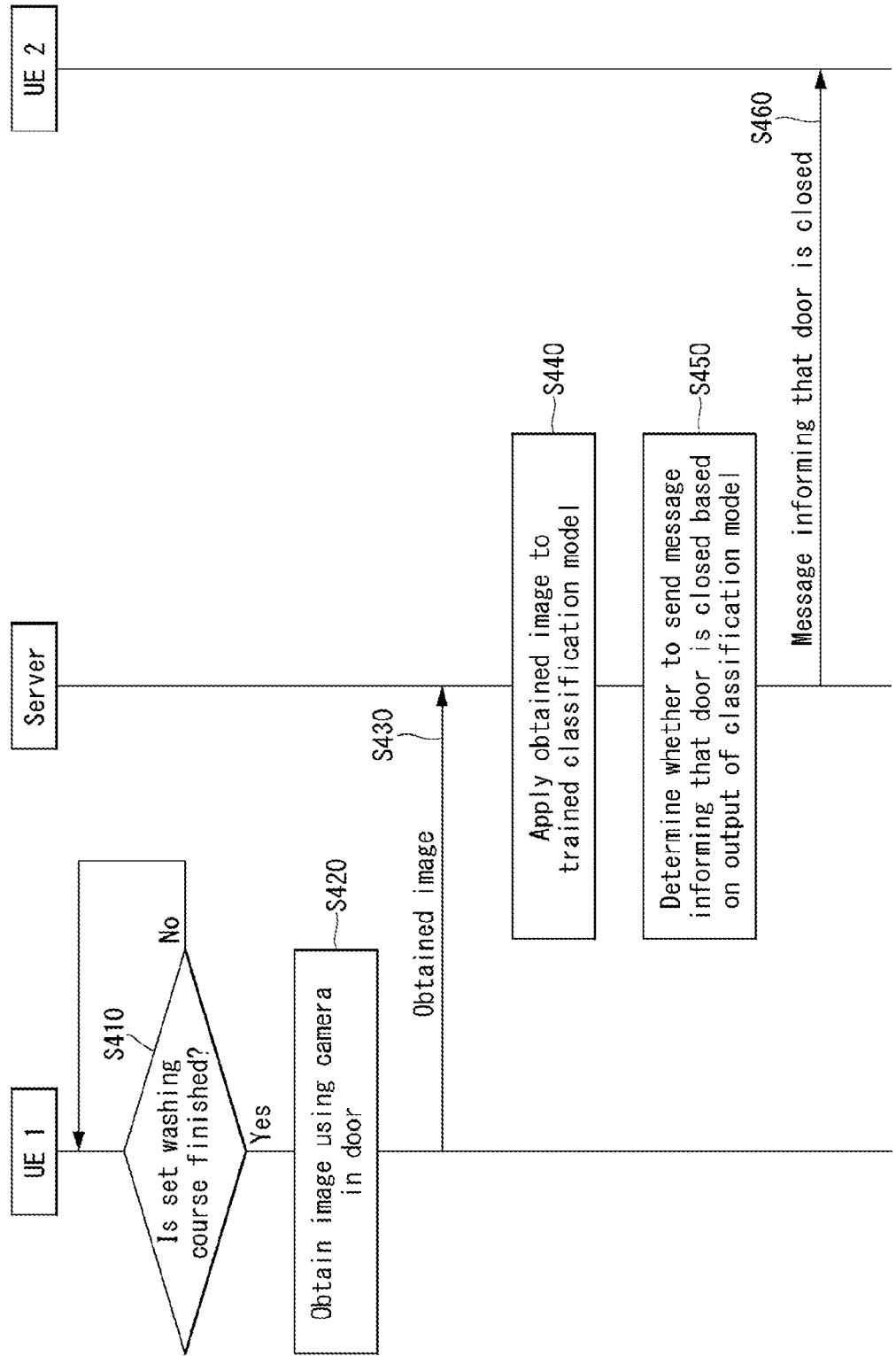
FIG. 18 is a sequence diagram of a door monitoring system according to another exemplary embodiment of the present disclosure.

Although FIGS. 17 and 18 illustrate by way of example that UE1 is a washing machine and UE2 is a smartphone, they also may be implemented as the aforementioned other electronic devices.

Referring to FIG. 17, when a set washing course is finished, the washing machine 10 may generate an image through a camera CAM1 placed in the door 418 (S310:YES, S320).

In various exemplary embodiments of the present disclosure, the washing machine 10 may identify that the door 418 is at a halt based on an obtained image. In an example, the washing machine 10 may obtain a plurality of images through the camera CAM1 and identify that the door 418 is at a halt by comparing a plurality of chronologically obtained images. At this point, upon identifying that the door 418 is at a halt, the washing machine 10 may start AI processing to identify the status of the door 418. In an example, the status of the door 418 may refer to the angle between the door 418 and the cabinet cover 416.

The washing machine 10 may apply the generated image to a learning model (S330).

In this case, the washing machine 10 may produce an output for the above-described learning model of images. In an example, the washing machine 10 may apply a plurality of images captured at different angles of the door 418 to a convolutional neural network-based learning model, and produce an output based on feature information of the plurality of images captured at different angles of the door 418.

The washing machine 10 may decide whether to send a message relating to the closing of the door 418 based on the output of the classification model (S340).

In an example, if the output exceeds a preset threshold, the washing machine 10 may decide to send to a communicatively connected terminal a message informing that the door 418 is closed. In an example, the message informing that the door 418 is not limited to a message informing that the door 418 is fully closed, but may include a message informing that the angle between the door 418 and the cabinet cover 416 is less than a specific angle.

Once it is decided that a message is to be sent to a communicatively connected external terminal, the washing machine 10 may send the message to the external terminal (S350).

In the case of AI processing in on-device mode as above, UE1 including the washing machine 10 does not always need to be communicatively connected to a server or network, and there is no risk of leakage of personal information relating to the user.

FIG. 18 is a sequence diagram of a door monitoring system according to another exemplary embodiment of the present disclosure. A description of redundancies between FIG. 17 and FIG. 18 will be omitted.

Referring to FIG. 18, when a set washing course is finished, the washing machine 10 may generate an image through a camera CAM1 placed in the door 418 (S410:YES, S420).

The washing machine 10 may send to a server the image obtained through the camera CAM1 through the communication module 760 (S430).

The server may apply the received image to a learning model (S440).

In this case, the server may produce an output for the above-described learning model of images. In an example, the server may apply a plurality of images captured at different angles of the door 418 to a convolutional neural network-based learning model, and produce an output based on feature information of the plurality of images captured at different angles of the door 418.

The server may decide whether to send a message relating to the closing of the door 418 based on the output of the classification model (S450).

In an example, if the output exceeds a preset threshold, the server may decide to send to a communicatively connected terminal a message informing that the door 418 is closed. In an example, the message informing that the door 418 is closed is not limited to a message informing that the door 418 is fully closed, but may include a message informing that the angle between the door 418 and the cabinet cover 416 is less than a specific angle.

Once it is decided that a message is to be sent to a communicatively connected external terminal, the server may send the message to the external terminal (S460).

Various exemplary embodiments of the present disclosure may be associated with various devices related to 5G service when combined with new radio (NR).

[5G Scenario]

Three key requirement areas of 5G include (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, generating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

The present disclosure to be described below may be implemented by combining or altering the embodiments in such a way as to meet the aforementioned requirements of 5G.

Figure 19:
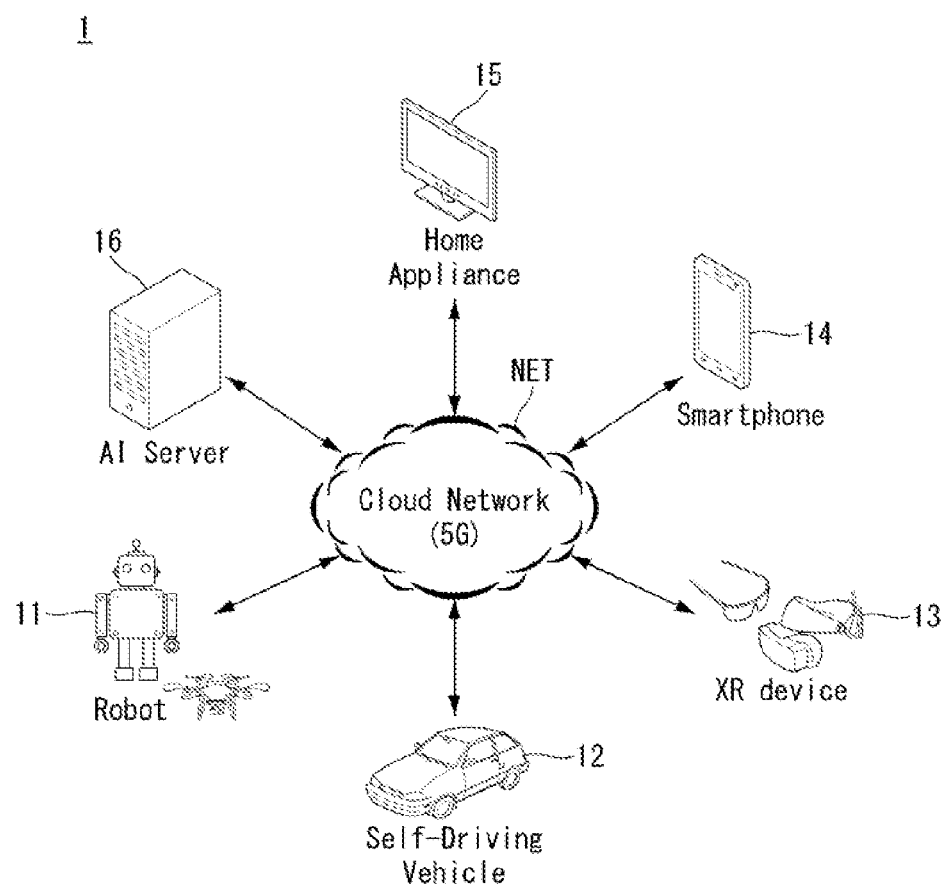
FIG. 19 is a conceptual diagram illustrating an exemplary embodiment of an AI device.

FIG. 19 is a conceptual diagram illustrating an exemplary embodiment of an AI device.

Referring to FIG. 19, in an AI system, at least one of an AI server NET, a robot 11, a self-driving vehicle 12, an XR device 13, a smartphone 14, or a home appliance 15 is connected to a cloud network 10. Here, the robot 11, the self-driving vehicle 12, the XR device 13, the smartphone 14, or the home appliance 15 to which the AI technology is applied may be referred to as AI devices 11 to 15.

The cloud network 10 may refer to a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 constituting the AI system may be connected to each other through the cloud network 10. In particular, each of the devices 11 to 15 may communicate with each other through a base station, but may directly communicate with each other without going through a base station.

The AI server NET may include a server that performs AI processing and a server that performs operations on big data.

The AI server NET may be connected to at least one of the robot 11, the self-driving vehicle 12, the XR device 13, the smartphone 14, or the home appliance 15, which are AI devices constituting the AI system, via the cloud network 10 and may help at least some of AI processing of the connected AI devices 11 to 15.

In this case, the AI server NET may train an artificial neural network according to a machine learning algorithm in place of the AI devices 11 to 15 and directly store a learning model or transmit it to the AI devices 11 to 15.

Here, the AI server NET may receive input data from the AI devices 11 to 15, infer a result value for the received input data by using a learning model, and generate a response or a control command based on the inferred result value to transmit the response or the control command to the AI devices 11 and 15.

Alternatively, the AI devices 11 to 15 may directly infer a result value for the input data using a learning model and generate a response or a control command based on the inferred result value.

<AI+Robot>

The robot 11 may be implemented as a guidance robot, a transportation robot, a cleaning robot, a wearable robot, an entertainment robot, a pet robot, an unmanned aerial robot, etc., to which the AI technology is applied.

The robot 11 may comprise a robot control module for controlling tasks. The robot control module may mean a software module or a chip in which a software module is implemented using hardware.

The robot 11 may obtain status information of the robot 11, detect (recognize) a surrounding environment and objects, generate map data, determine its movement path and travel plan, determine a response to a user interaction, or determine a task, by using sensor information obtained from various kinds of sensors.

Here, the robot 11 may use sensor information obtained from at least one sensor among lidar, radar, and a camera, in order to determine its movement path and travel plan.

The robot 11 may perform the above tasks by using a learning model consisting of at least one artificial neural network. For example, the robot 11 may recognize a surrounding environment and objects by using a learning model, and determine a task by using information on the recognized surrounding environment information or objects. Here, the learning model may be trained directly on the robot 11, or may be trained on an external device, such as the AI server NET.

The robot 11 may perform a task by generating results directly by using the learning model, or may perform a task by transmitting sensor information to an external device, such as the AI server NET, and receiving results generated from it.

The robot 11 may determine its movement path and travel plan by using at least one among map data, object information detected from sensor information, and object information obtained from an external device. The robot 11 may travel according to the determined movement path and travel plan by controlling the driving unit.

The map data may include object identification information for various objects disposed in a space in which the robot 11 moves. For example, the map data may include object identification information for fixed objects, such as walls and doors, and movable objects, such as flowerpots and desks. Moreover, the object identification information may include name, type, distance, location, etc.

Moreover, the robot 11 may perform a task or travel by controlling the driving unit based on the user's control/interaction. At this point, the robot 11 may obtain information on the intent of the interaction according to the user's motion or speech utterance and perform a task by determining a response based on the obtained intention information.

<AI+Autonomous Driving>

The self-driving vehicle 12 may be implemented as a mobile robot, a vehicle, an unmanned aerial vehicle, etc., to which the AI technology is applied.

The self-driving vehicle 12 may comprise an autonomous driving control module for controlling the autonomous driving function, and the autonomous driving control module may mean a software module or a chip in which the software module is implemented using hardware. The autonomous driving control module may be internally included as a component of the autonomous driving vehicle 12, or may be configured as a separate piece of hardware and connected to the outside of the autonomous driving vehicle 12.

The self-driving vehicle 12 may obtain status information of the self-driving vehicle 12 by using sensor information obtained from various types of sensors, detect (recognize) a surrounding environment and objects, generate map data, determine its movement path and travel plan, or determine a task.

Like the robot 11, the self-driving vehicle 12 may use sensor information obtained by at least one sensor among lidar, radar, and a camera, in order to determine its movement path and travel plan.

In particular, the self-driving vehicle 12 may recognize an environment or object in an area hidden from view or an area extending a certain distance or longer by receiving sensor information from external devices, or may receive recognized information directly from external devices.

The self-driving vehicle 12 may perform the above tasks by using a learning model consisting of at least one artificial neural network. For example, the self-driving vehicle 12 may recognize a surrounding environment and objects by using a learning model, and determine the course of travel by using the recognized surrounding environment information or object information. Here, the learning model may be trained directly on the self-driving vehicle 12, or may be trained on an external device, such as the AI server NET.

The self-driving vehicle 12 may perform a task by generating results directly by using the learning model, or may perform a task by transmitting sensor information to an external device, such as the AI server NET, and receiving results generated from it.

The self-driving vehicle 12 may determine its movement path and travel plan by using at least one among map data, object information detected from sensor information, and object information obtained from an external device. The self-driving vehicle 12 may travel according to the determined movement path and travel plan by controlling the driving unit.

The map data may include object identification information for various objects disposed in a space (e.g., road) in which the self-driving vehicle 12 travels. For example, the map data may include object identification information for fixed objects, such as streetlights, rocks, and buildings, and movable objects, such as vehicles and pedestrians. Moreover, the object identification information may include name, type, distance, location, etc.

Moreover, the self-driving vehicle 12 may perform a task or travel by controlling the driving unit based on the user's control/interaction. In this case, the self-driving vehicle 12 may obtain information about the intent of the interaction via the user's motion or speech utterance and determine a response based on the obtained intention information and perform the task.

<AI+XR>

The XR device 13 may be implemented as a HUD (head-up display), television, a mobile phone, a smartphone, a computer, a wearable device, a home appliance, a digital signage, a vehicle, a stationary robot, or a mobile robot, to which the AI technology is applied.

The XR device 13 may obtain information on a surrounding space or real-world object by analyzing three-dimensional point cloud data or image data obtained through various sensors or from an external device and generating location data and attribute data for three-dimensional points, and may render and output an XR object. For example, the XR device 13 may output an XR object containing additional information on a recognized object by matching it to the recognized object.

The XR device 13 may perform the above tasks by using a learning model consisting of at least one artificial neural network. For instance, the XR device 13 may recognize a real-world object from three-dimensional point cloud data or image data by using a learning model, and provide information corresponding to the recognized real-world object. Here, the learning model may be trained directly on the XR device 13 or trained on an external device such as the AI server NET.

The XR device 13 may perform a task by generating results directly by using the learning model, or may perform a task by transmitting sensor information to an external device, such as the AI server NET, and receiving results generated from it.

<AI+Robot+Autonomous Driving>

The robot 11 may be implemented as a guidance robot, a transportation robot, a cleaning robot, a wearable robot, an entertainment robot, a pet robot, or an unmanned aerial robot, to which the AI technology and the autonomous driving technology are applied.

The robot 11 to which the AI technology and the autonomous driving technology are applied may mean a robot 11 with autonomous driving functionality or a robot 11 that interacts with a self-driving vehicle 12.

The robot 11 with autonomous driving functionality may collectively refer to devices that move on their own along a given route without user control or move along a route determined by themselves.

The robot 11 with autonomous driving functionality and the self-driving vehicle 12 may use a common sensing method to determine one or more between a movement path and a travel plan. For example, the robot 11 with autonomous driving functionality and the self-driving vehicle 12 may determine one or more between a movement path and a travel plan by using information sensed by lidar, radar, and a camera.

The robot 11 interacting with the self-driving vehicle 12 may exist separately from the self-driving vehicle 12 and, at the same time, may be associated with the autonomous driving function inside or outside the self-driving vehicle 12, or may perform a task associated with a user riding in the self-driving vehicle 12.

In this case, the robot 11 interacting with the self-driving vehicle 12 may acquire sensor information in place of the self-driving vehicle 12 and provide it to the self-driving vehicle 12, or may acquire sensor information, generate information on the surrounding environment or objects, and provide it to the self-driving vehicle 12, thereby controlling or assisting the autonomous driving function of the self-driving vehicle 12.

Alternatively, the robot 11, while interacting with the self-driving vehicle 12, may control the functions of the self-driving vehicle 12 by monitoring a user riding in the self-driving vehicle 12 or interacting with the user. For instance, if the driver is deemed dozing off, the robot 11 may enable the autonomous driving function of the self-driving vehicle 12 or assist in controlling the driving unit of the self-driving vehicle 12. Here, the functions of the self-driving vehicle 12 controlled by the robot 11 may include functions provided by a navigation system or audio system provided inside the self-driving vehicle 12, as well as the autonomous driving function.

Alternatively, the robot 11 outside the self-driving vehicle 12, which is interacting with the self-driving vehicle 12*b*, may provide information to the self-driving vehicle 12 or assist the functions of the self-driving vehicle 12. For instance, the robot 11 may provide traffic information including signaling information to the self-driving vehicle 12, like smart traffic lights do, or may automatically connect an electricity charger to a socket by interacting with the self-driving vehicle 12, like an automatic electricity charger of an electric vehicle does.

<AI+Robot+XR>

The robot 11 may be implemented as a guidance robot, a transportation robot, a cleaning robot, a wearable robot, an entertainment robot, a pet robot, an unmanned aerial robot, or a drone, to which the AI technology and the XR technology are applied.

The robot 11 to which the XR technology is applied may mean a robot that is controlled and interacted with within an XR image. In this case, the robot 11 is distinct from the XR device 13, and may interface with it.

Once the robot 11 that is controlled and interacted with within an XR image obtains sensor information from sensors including a camera, the robot 11 or XR device 13 may generate an XR image based on the sensor information, and the XR device 13 may output the generated XR image. Also, such a robot 11 may operate based on a control signal fed through the XR device 13 or based on user interaction.

For example, the user may see an XR image from the point of view of a remotely connected robot 11 through an external device such as the XR device 13, and may adjust the robot 11's autonomous driving route via interaction, control tasks or driving, and see information on surrounding objects.

<AI+Autonomous Driving+XR>

The self-driving vehicle 12 may be implemented as a mobile robot, a vehicle, or an unmanned aerial vehicle, to which the AI technology and the XR technology are applied.

The self-driving vehicle 12 to which the XR technology is applied may mean a self-driving vehicle equipped with a means for providing an XR image or a self-driving vehicle that is controlled and interacted with within an XR image. Particularly, the self-driving vehicle 12 that is controlled and interacted with within an XR image is distinct from the XR device 13, and may interface with it.

The self-driving vehicle 12 equipped with a means for providing an XR image may obtain sensor information from sensors including a camera, and output a generated XR image based on the obtained sensor information. For instance, the self-driving vehicle 12 may provide a passenger with an XR object corresponding to a real-world object or on-screen object by having an HUD and outputting an XR image on it.

In this instance, when an XR object is outputted on the HUD, at least part of the XR object may overlap a real object where the passenger's gaze is directed. On the other hand, when an XR object is outputted on a display provided inside the self-driving vehicle 12, at least part of the XR object may overlap an on-screen object. For example, the self-driving vehicle 12 may output XR objects corresponding to objects such as driveways, other vehicles, traffic lights, traffic signs, two-wheeled vehicles, pedestrians, buildings, etc.

Once the self-driving vehicle 12 which is controlled and interacted with within an XR image obtains sensor information from sensors including a camera, the self-driving vehicle 12 or XR device 13 may generate an XR image based on the sensor information, and the XR device 13 may output the generated XR image. Also, such a self-driving vehicle 12 may operate based on a control signal fed through an external device such as the XR device 13 or based on user interaction.

<Extended Reality>

Extended reality (XR) collectively refers to virtual reality (VR), augmented reality (AR), and mixed reality (MR). The VR technology is a computer graphics technology that provides real-world objects or backgrounds only in the form of CG images, the AR technology is a computer graphics technology that provides virtual CG images overlaid on images of physical objects, and the MR technology is a computer graphics technology that involves the mixing and merging of virtual objects and the real world.

The MR technology is similar to the AR technology in that it shows both a real object and a virtual object. However, the difference is that, in the AR technology, a virtual object is used to supplement a real object, and, in the MR technology, a virtual object and a real object are used as equals.

The XR technology may be applied to head-mounted displays (HMD), head-up displays (HUD), mobile phones, tablet PCs, laptop computers, desktop computers, TVs, digital signage, and so on, where a device employing the XR technology may be called an XR device.

What is claimed is:

1. A method for monitoring a door of an artificial intelligence enabled device, the method comprising:
    capturing an image with a camera;
    producing an output for identifying a status of the door by inputting the captured image into a trained learning model;
    determining whether to send a message based at least in part on the produced output,
    wherein the message comprises information that an angle between the door and a cabinet cover is less than a specific angle; and
    performing artificial intelligence processing to determine the status of the door based at least in part on a determination that the door has stopped moving based on the captured image.

2. The method of claim 1, wherein the camera is positioned between an outer cover of the door and an inside glass.

3. The method of claim 1, wherein the image is captured after a preset time period after the door is open following completion of a set washing course.

4. The method of claim 1, wherein the trained learning model corresponds to a classification model.

5. The method of claim 4, wherein the classification model corresponds to an artificial neural network-based learning model trained using a plurality of images depicted for different angles between the door and the cabinet cover.

6. The method of claim 5, wherein the plurality of images comprises a first image group depicted for angles between a first angle and a second angle and a second image group depicted for angles between a third angle and a fourth angle, wherein the first image group is labeled with first class information to send the message, and the second image group is labeled with second class information to not send the message.

7. The method of claim 6, wherein the first and second angles correspond to angles at which the door is opened with no ventilation.

8. The method of claim 6, wherein the third and fourth angles correspond to angles at which the door is opened with ventilation.

9. The method of claim 6, wherein the second angle is a same angle as the third angle.

10. The method of claim 5, wherein the artificial neural network-based learning model corresponds to a convolutional neural network-based learning model.

11. The method of claim 1, wherein the artificial intelligence enabled device is a washing machine, a dryer, or a steamer.

12. An intelligent device comprising:
    a memory;
    a camera placed in a door for capturing an image; and
    a processor that is configured to:
    produce an output for identifying a status of the door by inputting the captured image into a trained learning model,
    determining whether to send a message based at least in part on the produced output,
    wherein the message corresponds to informing that an angle between the door and a cabinet cover is less than a specific angle, and
    perform artificial intelligence processing to determine the status of the door based at least in part on a determination that the door has stopped moving based on the captured image.

13. The intelligent device of claim 12, wherein the camera is positioned between an outer cover of the door and an inside glass.

14. The intelligent device of claim 12, wherein the image is captured after a preset time period and based at least in part on a determination that the door is open according to a completion of a set washing course.

15. The intelligent device of claim 12, wherein the trained learning model corresponds to a classification model.

16. The intelligent device of claim 15, wherein the classification model corresponds to an artificial neural network-based learning model trained by a plurality of images generated for different angles between the door and the cabinet cover.

17. The intelligent device of claim 16,
    wherein the plurality of images comprises a first image group generated for angles between a first angle and a second angle and a second image group generated for angles between a third angle and a fourth angle, wherein the first image group is labeled with first class information to send the message, and the second image group is labeled with second class information to not send the message.

18. The intelligent device of claim 17, wherein the first and second angles corresponds to angles where the door is opened with no ventilation.

19. The intelligent device of claim 17, wherein the third and fourth angles correspond to angles where the door is opened with ventilation.

* * * * *